Aug. 4, 1936.    L. EMANUELI    2,049,835
METHOD OF JOINING FLUID FILLED ELECTRIC CABLES
Original Filed Oct. 30, 1930    2 Sheets-Sheet 1
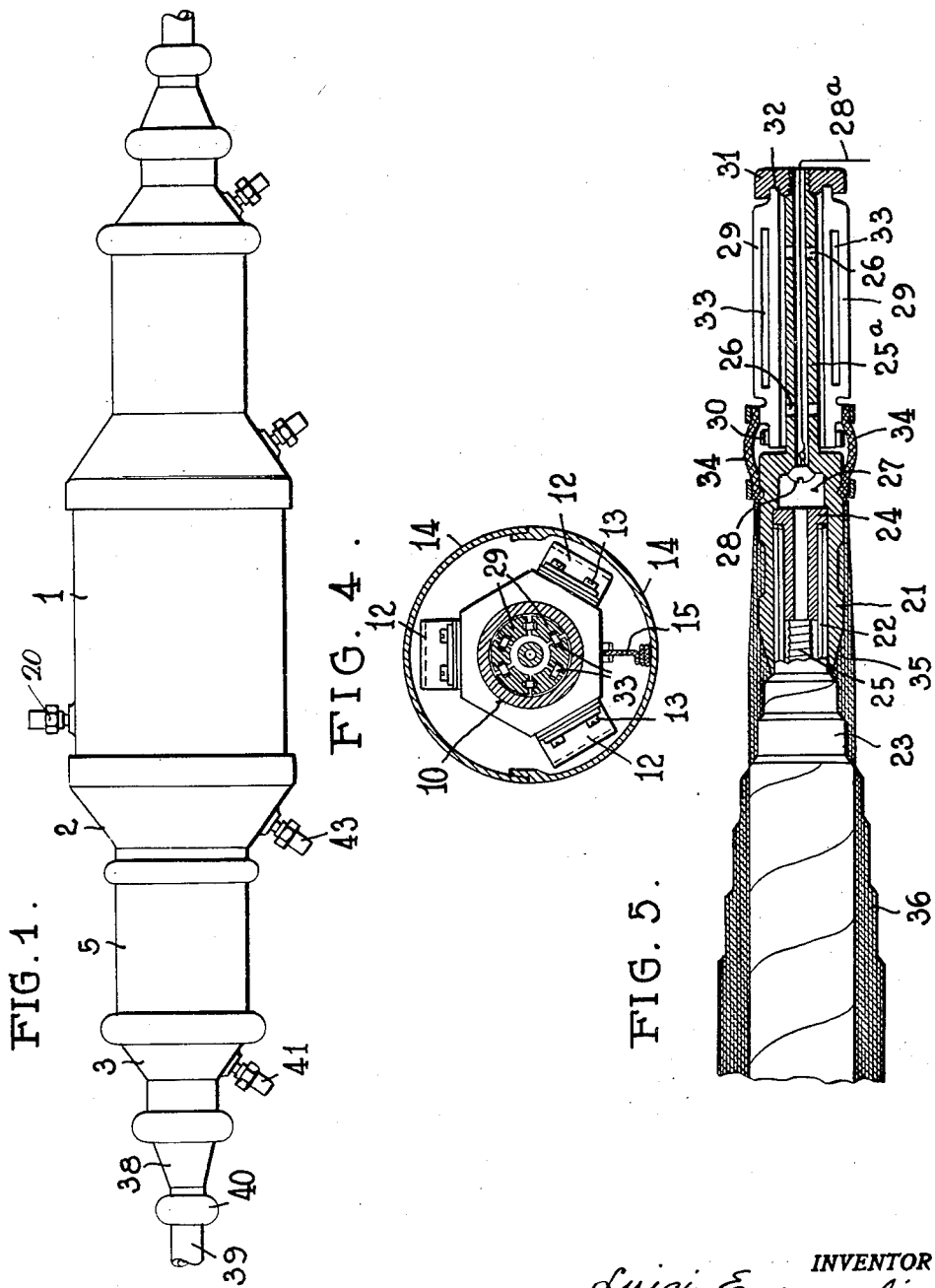
INVENTOR
Luigi Emanueli,
BY Stone, Boyden & Mack
ATTORNEYS Aug. 4, 1936.   L. EMANUELI   2,049,835
METHOD OF JOINING FLUID FILLED ELECTRIC CABLES
Original Filed Oct. 30, 1930   2 Sheets—Sheet 2
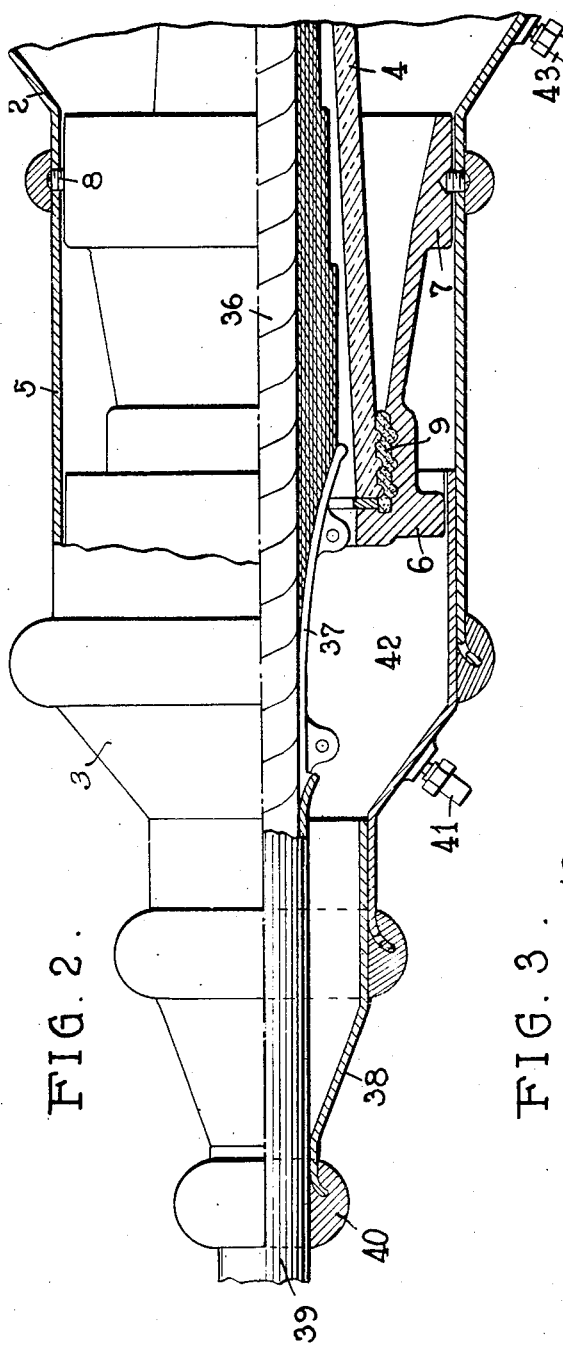
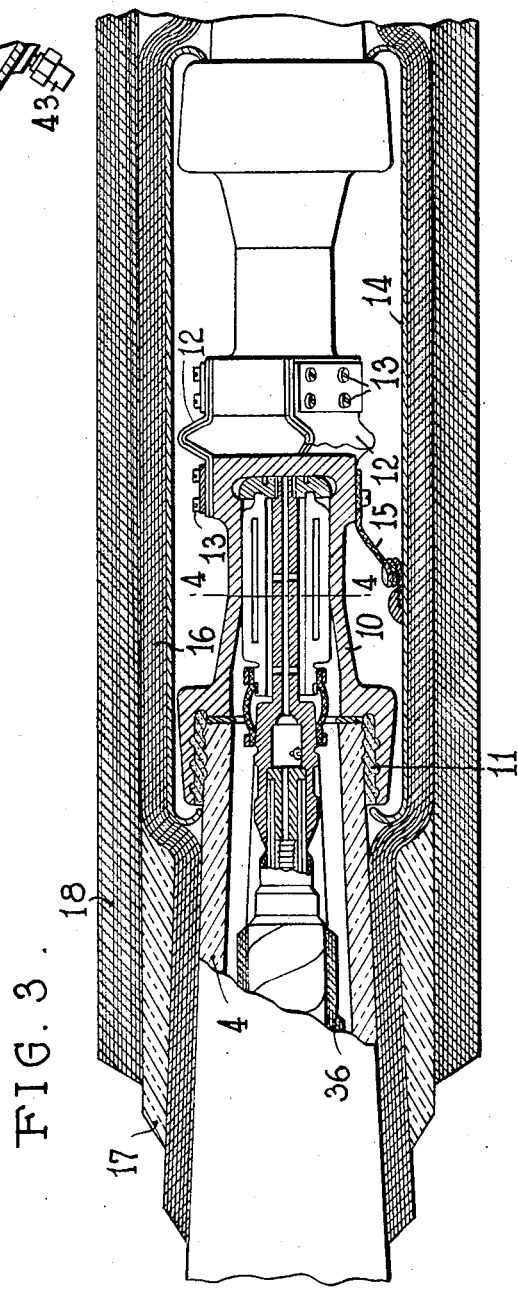
INVENTOR
Luigi Emanueli,
BY
Stone, Boyden & Mack,
ATTORNEY Patented Aug. 4, 1936

2,049,835

UNITED STATES PATENT OFFICE 2,049,835

METHOD OF JOINING FLUID FILLED ELECTRIC CABLES

Luigi Emanueli, Milan, Italy, assignor to S. I. Pirelli, a corporation of Italy

Original application October 30, 1930, Serial No. 492,343, Patent No. 1,979,149. Divided and this application March 23, 1934, Serial No. 717,121. In Canada and South Africa July 15, 1931

5 Claims. (Cl. 173—268)

The present invention is directed to an improved method of joining high tension fluid filled electric cables.

This application is a division of application Serial No. 492,343, filed October 30, 1930, which on October 30, 1934 matured into Patent No. 1,979,149, and in which an improvement is disclosed and claimed over my former U. S. Patent 1,698,051, issued January 8, 1929. While the invention claimed in my said Patent No. 1,979,149, above referred to, is directed to the structure of an improved joint for connecting high tension fluid filled electric cables, the present invention disclosed and claimed herein is directed to the improved method of joining cables of this type and to the method of assembling my improved joint. Prior to the filing of the above mentioned parent application, it was the practice to ship cable which had been filled with oil from the factory to the point of installation, the ends of said cable being suitably sealed during transit to prevent escape of oil. It also had been the practice to make the joints in the field wherever required, usually in manholes below the surface of the streets where the working conditions were extremely unfavorable due to lack of space, and due to dirt and moisture. In addition, the jointer had to contend with a certain although limited amount of oil which escaped from the conductor ends during the splicing or joining operation.

It is an object of this invention to provide an improved method of joining the ends of these high tension fluid filled electric cables which will reduce to a minimum the amount of work which the jointer has to do in the field.

It is a further object of the invention to provide a method for joining these cables where the more difficult operations of making the joint such as the placement of insulation therearound and the filling of the casing with degasified oil may be done in the factory where the conditions are favorable to good workmanship and where close inspection by competent persons is available at all steps in the manufacture.

It is a still further object of the invention to provide a method of joining these cable ends which will permit the manufacture of the joint, its wrapping with insulation and filling with a permanent charge of degasified oil at the factory and hence relieve the necessity for performing this delicate operation at the point of installation.

Numerous other and further objects of the invention will be apparent from a consideration of the following specification when taken in connection with the accompanying drawings.

In the drawings which are illustrative of my invention,

Fig. 1 is a view of a stop joint in elevation;

Fig. 2 is a part sectional and part elevational view of the left end of the joint of Fig. 1;

Fig. 3 is a sectional view of the mid-section of the joint of Fig. 1 with the outside casing omitted;

Fig. 4 is a cross sectional view taken on line 4—4 of Fig. 3; and

Fig. 5 is a sectional view of one end of the cable section or reel length and illustrates the part of the joint which is made in the field.

It is to be understood that stop joints are special joints used for interrupting the flow of oil or other insulating liquid between two adjacent sections of a fluid filled cable, while the electrical connection between the sections is maintained.

As indicated above, my improved joint comprises two distinct parts, i. e., the part which is prepared in the factory which is the principal part and which is later shipped with its contents intact to the point of installation, and the minor part which is prepared by the jointer in the field.

The part which is prepared in the factory comprises a cylindrical outer casing 1 in the form of a tube, a cylindrical element 5 of reduced diameter which is suitably jointed to the tube 1 by means of a conical portion 2, and an element 3 comprising a conical portion and a cylindrical portion of still smaller diameter which element 3 is suitably jointed to the element 5. The various parts of the casing are telescopically arranged and may be joined by wiped soldered joints. The opposite end of the casing is similarly constructed.

Inside of the casing are two duplicate insulators 4 made of porcelain or equivalent material, said insulators being of tubular form and gradually tapering from the outer to the inner end, there being a small clearance between the inner wall thereof and the insulation on the encased conductor. For simplicity only one of these insulators is shown but it is to be understood that both are alike and are supported in the same manner and having the same axis.

The large end of the insulator is supported in a metal cap which comprises a head 6 and a bell-shaped portion 7 which fits the inner wall of the part 5 of the casing and is held in place by screws 8 which are subsequently covered with solder to seal the joints. The head makes a good fit with the inner wall of a cylindrical portion of the casing part 3 and is soldered thereto to seal the joint. It will be observed that the parts 3 and 5 of the casing are in telescopic relation which serves to stiffen the casing in the region of the head. The cap is supported at both ends, by the head at one end and the flaring end 7 at the other. As a result the insulator is freed of any casing strains. The cap and insulator are united by a body of cement 9. It is desirable to provide a gasket between the insulator and the cap to prevent direct contact between them.

The inner end of the insulator is also provided with a metal cap 10 which to distinguish it from the other cap and also to designate its purpose will be termed a "contact cap". This cap has a socket at one end to receive the inner end of the insulator and the two parts are united by a body of cement 11. By dispensing with flanges on the insulators and making them of tubular form the danger of breaking or cracking both in the manufacture of the insulator and in the assembly is greatly reduced. The cap has a closed inner end and also a cylindrical bore or socket to receive the inner end of the contact making parts which are affixed to the cable end. The closed ends or heads of the opposed contact caps are united by bent strips of copper or equivalent material 12 which are fastened in place by screws 13. These strips electrically connect the caps and also form a flexible coupling which will take care of contraction and expansion of the conductors in the direction of their length and also reduce to a minimum the strains which would be occasioned by any lack of alignment of the two insulators 4 and their caps. It is of paramount importance to prevent cracking of the porcelain insulators during manufacture and assembly both in the factory and in the field.

In order to obtain a suitable distribution of the electric field about the contact caps and coupling, a metal shell or shield 14 is provided which surrounds them. It has inturned ends which cover the outer ends of the caps and closely surround and are supported by the porcelain insulators. Because of its shape the shell in order to be assembled has to be divided and in this instance it is divided longitudinally into two equal parts, as shown in Fig. 4, and the joint between the parts is soldered or otherwise made. Prior to uniting the halves of the shell a flexible conductor 15 is secured at one end to the shell and the other end to one of the contact caps so that said parts have the same potential. The shell and adjacent ends of the insulators are covered with numerous layers of paper 16 or other insulating material, which layers are applied longitudinally so that the electrical forces will be perpendicular to the surface of the paper. In applying the paper, suitable binding material is used, for example a silk thread is wrapped thereon between every three or four layers.

As the diameter of the shell 14 is larger than that of the inner ends of the insulators 4, a second body of insulation 17 is provided at each end of the shell which covers a part of the insulators and also the ends of the insulation 16. It is made of folded-over paper tape which is held in place by any suitable binding means. Over the insulations thus applied is a third body of insulation 18 made of impregnated cable paper. In forming this body a width of paper is selected which is great enough to cover the central body and all or practically all of the end bodies of applied insulation. When finished the outer body forms a tube, and the layers are prevented from loosening by means of any suitable binding material.

In assembling the parts of the joint thus far described the inner parts are first prepared and insulated, after which the casing parts are slipped endwise into place and properly united to form a hermetically sealed casing. The casing is then evacuated and for this purpose the fitting 20 is employed. After being evacuated the casing is filled with degasified oil and sealed at the fitting 20, after which the joint is ready to be sent to the place of installation. In this connection, particular attention is called to the fact that the jointer in completing the joint in no way disturbs the casing or its contents, all necessary work thereon having been done at the factory. Due to this much time and labor are saved in the field and elaborate evacuating and filling operations are avoided.

In Fig. 5 are illustrated the parts which are assembled in the field using for the purpose certain metal parts which are made at the factory. Each connector comprises a relatively long sleeve having a socket 21 at one end to receive the strands 22 of the conductor after the insulation 23 thereof has been removed in a series of steps. Inside the conductors and resting on an internal shoulder in the socket is a flanged metal sleeve 24, one end of which engages the spirally wound metal core 25 over which the conductors are stranded. The core of the cable when installed is filled with degasified oil or other liquid insulation and since it is difficult to make a soldered joint under these conditions a vice or other mechanical device is employed to squeeze the wall of the socket about the conductor strands, the sleeve 24 serving to withstand the pressure so exerted. Each connector also has a tubular extension 25a of smaller diameter than the socket and contains ports 26 through which oil is free to flow from the cable core into and through the small annular space between the conductor covering and the inner wall of the porcelain insulator. In the socket portion of the connector is a small chamber 27 which contains oil received from the cable core. The opening from the chamber to the tube 25a is controlled by a small valve or stopper 28 to which is attached a thread or string 28a for seating it. This valve is seated when the socket is applied to the conductor end so as to prevent the escape of oil from the conductor core and remains in this position until the work of assembling is completed. The string is broken before the cable end is inserted in the factory made joint. During the period of time required to strip the conductor of its lead sheath and insulation preparatory to applying the connector a limited amount of oil will escape from the core which serves to prevent the entrance into the cable of air and moisture. The amount of oil which escapes will be largely governed by the pressure exerted by the reservoir at the end of the cable away from the place where the joint is being made.

Surrounding the tube 25a and spaced therefrom is a series of individually movable contact bars 29 which are loosely held at one end by a band or ring 30 and at the other end by a disk 31 which is screw threaded on the end of the tube and has a groove 32 to receive the notched ends of the bars. A steel spring 33 is located between each pair of bars and exerts pressure therein tangentially. Since the bars are radially disposed about a common center these springs press them outwardly, the band or ring 30 limiting their outward movement at one end while the groove 32 acts as a pivot for each of the bars. The bars are individually connected to the base of the socket by flexible copper connectors 34 which permits each bar to properly seat or engage with the wall or bore of the contact cap and because of the resiliency of the structure as a whole this will take place without imposing any undue strains on the cap and hence on the porcelain insulator.

After the mechanical parts are assembled the wall of the socket and adjacent stepped insulation 23 are covered with a body of insulation, such as varnished tape 35 for example. The cable end is then covered with insulation 36 for example of paper tape to the desired thickness. After this the electrostatic controls 37, Fig. 2, are mounted in place. These controls are made of two pieces of metal united by flanges and screws and are flared to fit over the insulation 36.

Having prepared the cable ends, the next step is to slip them into place in open ends of the factory prepared part of the joint, after which the thimbles 38 which have previously been slipped over the cable ends are connected to the casing and to the lead sheath 39 of the cable by wiped soldered joints 40. To some part of the casing on the cable side of the head is attached a fitting 41 by which this part of the casing is first evacuated and later filled with degasified oil and through which oil may be admitted to and received from the cable as its temperature changes, a suitable reservoir being used for the purpose. This treatment has to be followed for both ends of the joint.

As has been previously stated the valves 28 are seated and hence oil from the core cannot flow from the core through the clearance space between the porcelain insulator and the cable into the chamber 42 as is necessary. To unseat the valves, which seal the cable sections against loss of oil, it being remembered that the casing in all its parts is completely filled with oil, pressure is applied to the oil in the chamber 42 through the fitting 41, as by a pressure pump for example, to a value sufficiently in excess of that in the cable core to unseat the valves 28 and permit them to fall into the chambers 27 where they no longer obstruct the flow of oil to and from the cable core. The pump is then removed and the usual connection made between the fitting and a reservoir of suitable character. When the seals are broken oil from the cable is in free communication with those spaces beyond or outside of the insulators, for example those defined by parts 3 of the casing.

In the part 2 of the casing which is in the joint side of the head or partition 6 which divides the same into two chambers, is a fitting 43 which ordinarily is not in use but which may be used in case of oil leakage in a cable section beyond to supply oil to said section. This may be done by connecting both fittings 41 and 43 to an oil reservoir. Under these conditions, the joint is temporarily ineffective as a stop joint but will nevertheless supply oil to take care of leakage until a repair can be made after which the fitting 43 will be sealed or plugged.

Instead of a separate fitting 43, the fitting 20 may be employed if desired.

It may also be pointed out that the valves 28 will remain closed during the period that the chamber 42 and the spaces communicating therewith are being evacuated and hence there is no danger of the vacuum pump withdrawing oil from the cable.

From the foregoing it will be seen that the casing and its contained parts are constructed to be shipped to the customer as a unitary structure, in other words, as an article of manufacture. In some instances these joint casing parts will be shipped for use with cable and terminal parts for a new installation and in others as repair or replacement parts. It is evident that modifications may be made in the particular form of the contact devices located within the contact caps without requiring changes in the casing and its parts.

It will be seen that by reason of my improved construction the casing and its parts may be made at the factory where the conditions of manufacture are most favorable, that the interior of the casing is evacuated and filled with oil so that no air or moisture can enter, and that so far as this part of the joint is concerned the jointer takes no part it its manufacture and does not have to disturb it in any way in making a joint all of which results in a better and cheaper final product.

What I claim is:

1. The method of joining sections of a high tension fluid filled electric cable, said cable sections each having a conductor surrounded by a metallic sheath, which method comprises permanently assembling parts of a joint within a casing, said joint having externally accessible sockets, each socket being adapted to receive one end of the conductor of its respective section, evacuating the casing and filling it with insulating fluid, shipping the casing with its contents intact to the point of installation, preparing the ends of the cable sections to be joined, inserting the ends of the conductors into their respective sockets in said joint, uniting the cable sheathing of each section to the joint casing to form chambers one surrounding each socket and the end of the cable section inserted therein, filling each chamber with insulating fluid and releasing the fluid within each cable section to communicate with the fluid in its respective chamber.

2. The method of joining sections of a high tension fluid filled electric cable, said cable sections each having a conductor surrounded by a metallic sheath, which comprises permanently assembling parts of a joint within a casing, said joint being provided with cavities forming externally accessibe sockets, evacuating the casing and filling it with insulating fluid, shipping the casing with its contents intact to the point of installation, preparing the ends of the cable sections to be joined, inserting the ends of the conductors into their respective sockets in said joint, uniting the ends of the joint casing to the adjacent sheathing of each cable section to form chambers one surrounding each socket and the end of the cable section inserted therein, filling each chamber with insulating fluid and establishing communication between the interior of each cable section and the space around its end within its respective chamber.

3. The method of joining sections of a high tension fluid filled electric cable, each of said cable sections having a conductor surrounded by a metallic sheath, which method comprises permanently assembling parts of a joint within a casing, said joint being provided with cavities forming externally accessible sockets, evacuating the casing and filling it with insulating fluid, shipping the casing with its contents intact to the point of installation, preparing the ends of the cable sections to be joined, inserting the ends of the conductors into their respective sockets in said joint without disturbing the contents of said casing, uniting the joint casing to the adjacent sheathing of each cable section to form chambers one surrounding each socket and the ends of the cable sections inserted therein, filling each chamber with a body of insulating fluid and releasing the fluid within each cable section to communicate with the fluid within its respective chamber surrounding its end.

4. The method of joining a pair of sections of high tension fluid filled electric cables, each of said cable sections having a conductor surrounded by a metallic sheath, which method comprises permanently assembling parts of a joint within a casing, said joint being provided with cavities forming externally accessible sockets, evacuating the casing and filling it with insulating fluid, shipping the casing with its contents intact to the point of installation, the ends of the cable sections to be joined being provided with valves, said valves being maintained against their seats by the pressure of the fluid within the cable sections, inserting the ends of the conductors into their respective sockets in said joint, uniting the casing of said joint to the sheathing of each adjacent cable section to form a pair of chambers, filling the space within each such chamber and around said cable ends with insulating fluid, and momentarily increasing the pressure thereof sufficiently to unseat said valves.

5. The method of joining a pair of sections of high tension fluid filled electric cables, each of said cable sections having a conductor surrounded by a metallic sheath, which method comprises permanently assembling parts of a joint within a casing, said joint being provided with cavities forming externally accessible sockets, evacuating the casing and filling it with insulating fluid, shipping the casing with its contents intact to the point of installation, the ends of the cable sections to be joined being provided with valves, said valves being maintained closed by the pressure of the fluid within the cable sections, inserting the ends of the conductors into their respective sockets in said joint, uniting the casing of said joint to the sheathing of the adjacent cable sections to form closed chambers, filling the spaces within such chambers and around said cable ends with insulating fluid, and finally opening said valves so as to establish communication between such spaces and the interiors of the cable sections.

LUIGI EMANUELI.